US009528238B2

(12) United States Patent
Taylor

(10) Patent No.: US 9,528,238 B2
(45) Date of Patent: Dec. 27, 2016

(54) LIGHT ALTERING BUMPER DEVICE

(71) Applicant: Zachary Taylor, Wells, ME (US)

(72) Inventor: Zachary Taylor, Wells, ME (US)

( * ) Notice: Subject to any disclaimer, the term of this patent is extended or adjusted under 35 U.S.C. 154(b) by 0 days.

(21) Appl. No.: 14/527,147

(22) Filed: Oct. 29, 2014

(65) Prior Publication Data

US 2015/0152616 A1 Jun. 4, 2015

Related U.S. Application Data

(60) Provisional application No. 61/911,389, filed on Dec. 3, 2013.

(51) Int. Cl.
*E02B 3/26* (2006.01)
*B63B 59/02* (2006.01)
*B63B 45/02* (2006.01)

(52) U.S. Cl.
CPC .................. *E02B 3/26* (2013.01); *B63B 45/02* (2013.01); *B63B 59/02* (2013.01)

(58) Field of Classification Search
CPC combination set(s) only.
See application file for complete search history.

(56) References Cited

U.S. PATENT DOCUMENTS

| 3,473,836 | A | * | 10/1969 | Halter | B60R 19/18 114/219 |
| 5,031,564 | A | * | 7/1991 | Beckerer, Jr. | E02B 3/26 114/219 |
| 2004/0179358 | A1 | * | 9/2004 | Tufte | B60Q 1/32 362/223 |
| 2009/0086498 | A1 | * | 4/2009 | Condon | B60Q 1/32 362/477 |
| 2010/0166502 | A1 | * | 7/2010 | Demay | E02B 3/26 405/215 |

\* cited by examiner

*Primary Examiner* — Amber Anderson
*Assistant Examiner* — Kyle Armstrong
(74) *Attorney, Agent, or Firm* — Christina Chamberlain; Chamberlain Legal Services, PLLC

(57) ABSTRACT

The present invention is an illuminating dock bumper for attachment to either a dock or a dock vehicle, comprising an elongate, forwardly projecting parabolic arch, which is of uniform substantially-arched cross-section; and an elongate structural tension member laterally extending between the lateral extremities of the parabolic arch, the structural tension member comprising a planar rear surface about which the structural tension member and thereby the bumper is secured to the dock or the dock vehicle, the structural tension member comprising an elongate, forwardly projecting, protective housing of uniform substantially-arched cross-section disposed on the front surface thereof and along the length thereof, the protective housing for receiving an elongate light source therewithin.

18 Claims, 7 Drawing Sheets

LIGHT ALTERING BUMPER DEVICE

RELATED APPLICATIONS

This application claims priority to U.S. Provisional Application No. 61/911,389 filed Dec. 3, 2013. The entire contents of the above application are hereby incorporated by reference as though fully set forth herein.

FIELD

The present invention relates to the field of dock bumpers. More specifically, the present invention relates to dock bumpers that increase visibility when docking a vehicle.

BACKGROUND

Dock bumpers are used to protect the docking vehicle, the dock, and any object it is attached to. In weather scenarios when visibility is greatly reduced such as in complete darkness, fog, and/or rain it is crucial the operator of the docking vehicle can properly see the dock in any condition.

Traditionally, docks are fitted with high powered, inefficient flood lights inundating the area with an excessive amount of light attempting to provide adequate visibility. Commonly, this lighting scenario is inadequate since these lights that produce high lumens create very dark shadows, can warp the perception of a space and will be rendered useless in inclement weather.

PRIOR ART

An application is needed were the light is emitted around the dock, outlining the dock-able face. There have been a few attempts in the prior art to meet this need, for example U.S. Pat. No. 6,095,074 to Reinhardt disclosing a boat bumper with a light for illumination. However, Reinhardt is limited to only provide light in a single direction. This directional light source limits the range in which the bumper is visible; as a result the bumper disclosed therein can easily be missed or blocked. In addition, the bumper disclosed therein is a standard bumper with a cavernous slit running in the front where the light is to be inserted and as such the design does nothing for the light emitting towards the docking vehicle creating a harsh strip of light directly into the eyes of the operator of the docking vessel. Additionally, there is minimum protection for the light source on the front face of the bumper disclosed therein where the bumper will come into contact with the docking vessel, leaving the fundamental element, the light exposed and in a vulnerable location to be easily damaged.

Similar issues arise in the U.S. Pat. No. 7,258,472 to Tufte disclosing an illuminated bumper assembly having an elongated light source for emitting light rays and an elongated bumper for carrying the elongated light source wherein the light source is in a vulnerable location to become damaged. Due to this weakness the author proposed a bumper mounted separate from the light source in the illuminated bumper assembly. This requires additional labor to mount the bumper and light source. Additionally, the bumper will block light preventing an even distribution of light.

Marine and automotive bumpers are designed to protect the vehicle when it comes in contact with another object. A bumper on a dock is the key component in preventing damage to both, the docking vehicle and the dock. While the operator is attempting to dock it is crucial the operator can properly see both the extents of the vehicle and the outline of the dock. An illuminated dock bumper will provide ambient light to the surrounding surfaces as well as provide a clear, distinguished line of illumination around the perimeter of the dock.

BRIEF SUMMARY OF THE INVENTION

It is the object of the present invention to address several challenges in previous attempts to illuminate dock surroundings. The present invention discloses an integrally formed, light altering bumper designed to amplify amounts of visible light from a self-contained, integrated light source. The present invention is an illuminating dock bumper for attachment to either a dock or a dock vehicle, comprising an elongate, forwardly projecting parabolic arch, which is of uniform substantially-arched cross-section; and an elongate structural tension member laterally extending between the lateral extremities of the parabolic arch, the structural tension member comprising a planar rear surface about which the structural tension member and thereby the bumper is secured to the dock or the dock vehicle, the structural tension member comprising an elongate, forwardly projecting, protective housing of uniform substantially-arched cross-section disposed on the front surface thereof and along the length thereof, the protective housing for receiving an elongate light source therewithin. The parabolic arch and the structural tension member may be integral with one another.

The light altering bumper may further comprise a light amplifying lobe that may be adjusted to direct the light source in different directions. In the preferred embodiment, the light altering bumper is used on a boat or other marine vessel and uses upper and lower mounting lobes to protect the boat or other objects they are attached to when the bumper comes in contact with the dock or other objects. The internal lighting source will illuminate the bumper in times of darkness, inclement weather, or low visibility. Further, this lighting source will also illuminate the top of the dock or other object that the vessel is approaching.

The light altering bumper is generally formed from a translucent (opaque), rubbery material or any other material that allows the bumper to absorb impacts while harnessing the non-visible light and creating visible light. This glowing affect will illuminate the entire perimeter of a dock or other objects it is attached to providing a clear indication of where the docking boat or other marine vessel should be docked. Since some light is still allowed to pass through the bumper, it will also help to illuminate the top of the dock or other objects it is attached to and any objects, watercrafts or otherwise, that are positioned adjacent to the bumper.

DETAILED DESCRIPTION

In the preferred embodiment of the light altering bumper of the present invention is formed from a translucent (opaque) polymer which will help to amplify the visible effects of light. Light will be reflected inside the material and diffused to create a glowing affect using indirect diffused light like a fluorescent tube as shown in further detail in FIG. 3. If the material was not translucent, something more transparent, light will pass through the bumper uninterrupted and remain invisible to the naked eye and be useless.

Figure 1:
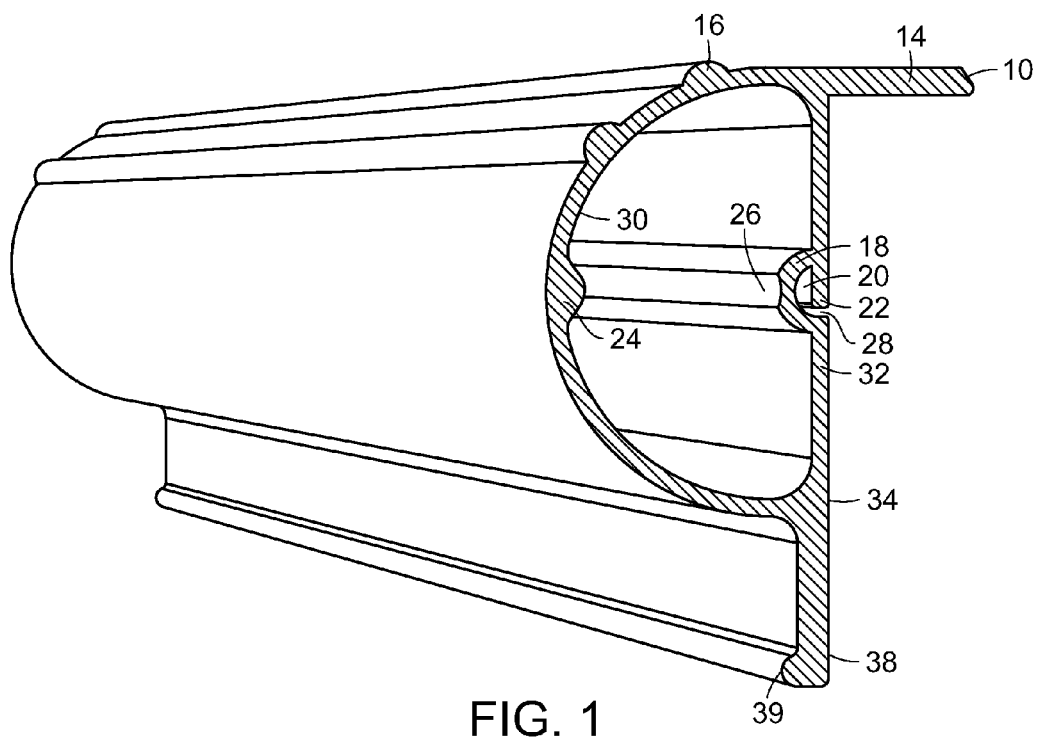
FIG. 1. Illustrates a sectional perspective of the light altering bumper of the present invention.
Figure 2:
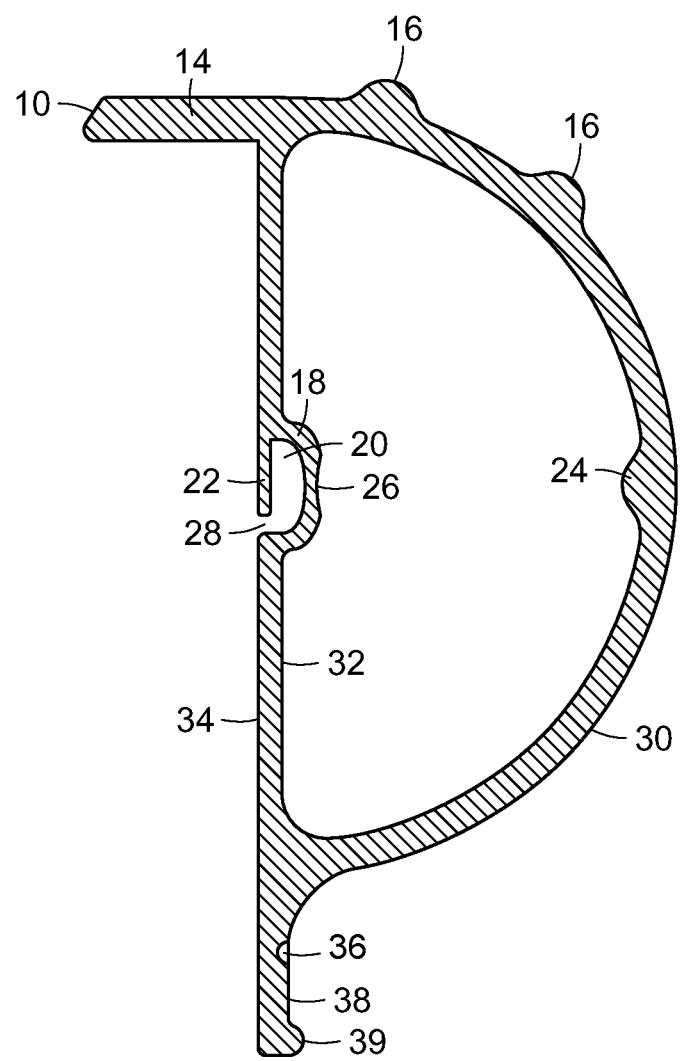
FIG. 2. Illustrates a cross section view of the light altering bumper of the present invention.

Turning to FIGS. 1 and 2, the light altering bumper is attached to an object using the top mounting lobe 14. A parabolic arch 30 may form the general shape of the bumper to help distribute any impacts the bumper may experience. The parabolic arch 30 has been used in architecture since the Romans and is still used today is structures for its' incredible ability to disperse forces. At the end of the top mounting lobe 14 is a chamfered angle cut 10 decreasing the rate of change from the dock surface to the top of the bumper, minimizing the possibility of an individual catching an edge and tripping. Molded handgrips 16 provide users with an added amount of surface area to grab without slipping off the smooth and slippery material. The outer surface of the parabolic arch 30 comprises at least one, elongate, grip 16 of uniform solid substantially semi-circular cross-section extending along the length thereof, the at least one grip integral with the parabolic arch. At least one molded handgrip 16 is disposed on the upper portion of the parabolic arch 30, which is between the middle and the upper lateral extremity of the parabolic arch 30. A structural tension member 32 is opposite the parabolic arch 30 and sits mounted against an object as shown in further detail in Fig and the structural tension member 32 parabolic arch 30 may be integral with one another. The structural tension member 32 comprises an elongate thorough gap disposed along the length thereof; the elongate gap for providing access to the light source 46.

A layer of a high reflective paint backing 34 may be applied to the vertical face of the light altering bumper or alternatively part or the entire structural tension member 32 may be molded from a solid white plastic.

A protective housing 18 surrounds a sealed internal housing 20, which is located adjacent to the structural tension member 32 and at the mid point opposite the parabolic arch 30. The protective housing 18 comprises a linear concave light refractor 26 disposed thereon, the linear concave light refractor 26 comprising a centrally-disposed, uniform, elongate concave depression extending along the length of the protective housing. The protective housing 18 may be opaque, using the same material or a more translucent plastic may be employed allowing for a greater amount of light to pass through to be altered. This housing has a housing access flap 22. There is a gap 28 formed below the housing access flap 22 and between the housing flap 22 and the structural tension member 32. Along the inner surface of the parabolic arch 30 comprises a linear bell-shaped light reflector 25 disposed thereon, the linear bell-shaped light reflector 24 comprising a backwardly-projecting, solid elongate member of uniform, substantially semi-circular cross-section; the linear bell-shaped light reflector 24 extending the length of the parabolic arch 30.

At opposite ends of the bumper are the top mounting lobe 14 and lower mounting lobe 38 where the bumper will be fastened directly to the dock. An elongate, substantially rectangular mounting lobe 14 extends perpendicularly or in line with the top lateral extremity of the structural tension member 32; the mounting lobe 14 about which, the bumper is attached over a horizontal surface. If the upper mounting lobe 14 is in line with the lateral extremity of the structural tension member 32 forming a U-shape then the bumper will be mounted to only a single directional surface. Alternatively, an elongate, substantially rectangular mounting lobe 14 extends downwardly from the bottom lateral extremity of the structural tension member 32; the mounting lobe about which, the bumper is attached to a vertical surface. The mounting lobe 14 comprises a forwardly-projecting, elongate member of uniform substantially semi-circular cross-section extending along the length thereof; the lateral extremity of elongate member being flush with that of the mounting lobe 14.

On the lower mounting lobe 38 a small circular cavity 36 is created for mounting screws allowing screws to be recessed within the bumper preventing any possible damage to the docking vehicle. At the bottom of the lower mounting lobe 38 is a small concave, semi-circular bulge of the mounting lobe bumper 39 also to protect the docking vehicle from being damaged by the mounting screws. If the bumper does not have the perpendicular mounting lobe 14 and is instead in line with the structural tension member 32 then a second mounting lobe bumper 39 will be located at the top of the upper mounting lobe 14.

The protective housing 18 becomes a crucial member in protecting the light source. This item creates the centralized sealed internal housing 20 creating a fully protected and waterproof chamber. The housing access flap 22 at the back of the chamber will allow of easy access to remove and replace the light if needed by peeling it back at the formed gap 28 and will reclose when released. After the light is replaced the gap can be easily resealed with a thin bead of silicon cocking to completely encase the lights within the bumper. Composing the vertical back edge of the bumper is a structural tension member 32 designed to limit the movement of the bumper to act as a monolithic article during impact minimizing deformity.

Figure 3:
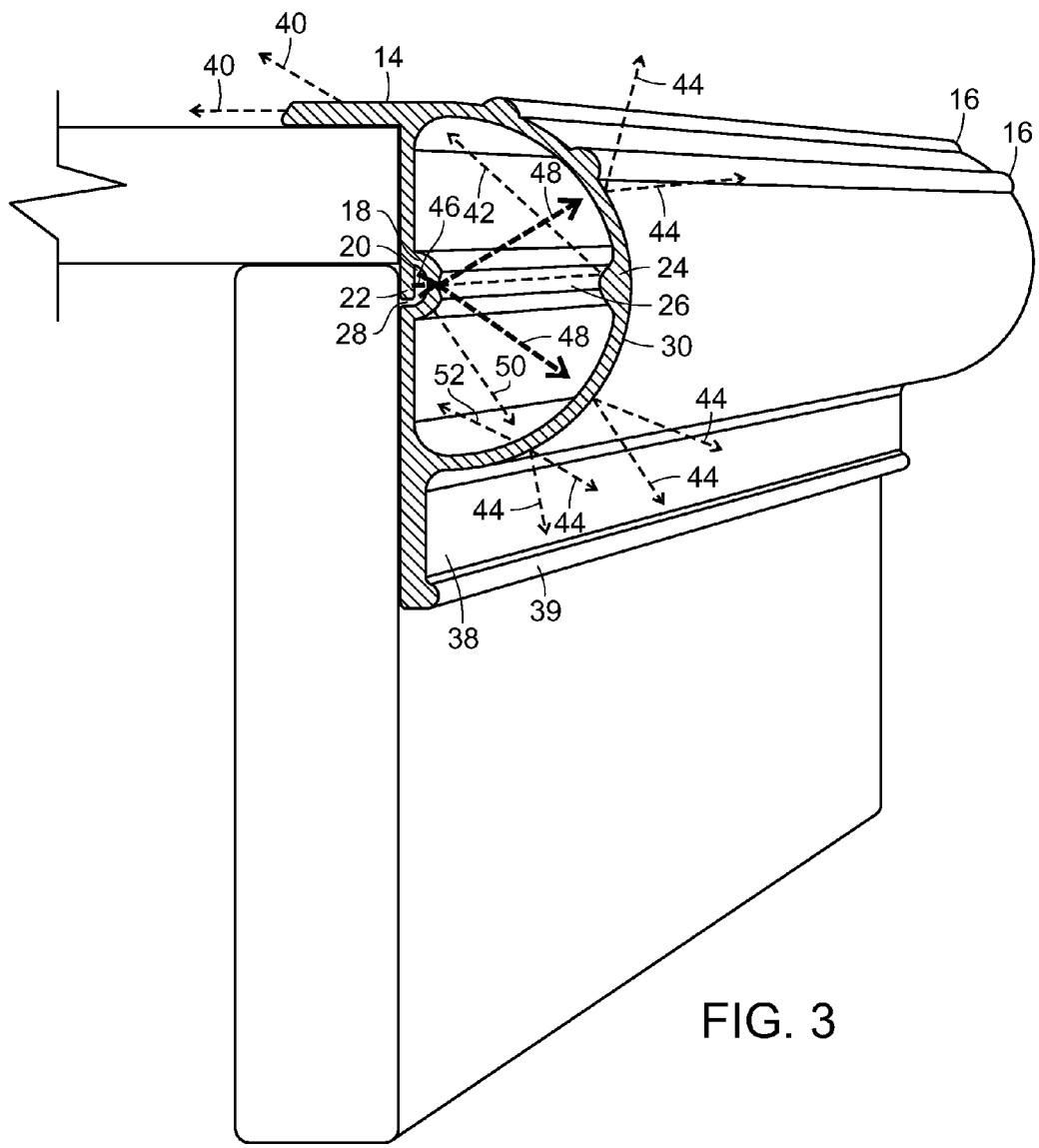
FIG. 3. Illustrates a section perspective of the light altering bumper attached to a dock.

Turning to FIG. 3, the light source 46 is shown inside the protective housing 18. Indirect diffused light 40 is shown emanating from the light altering bumper assembly towards the object it is mounted upon, which in this case is a boat dock. Indirect reflected light 42 is reflected off the linear bell-shaped light reflector 24. Refracted diffused light 48 exits the light source and is refracted through the linear concave light refractor 26 and become further diffused as it passes through the light altering bumper opaque material to become twice diffused light for high ambient distribution 44. Diffused light 50 exits the protective housing 18 and is further reflected off the parabolic arch 30 to create reflected diffused light 52.

Figure 4:
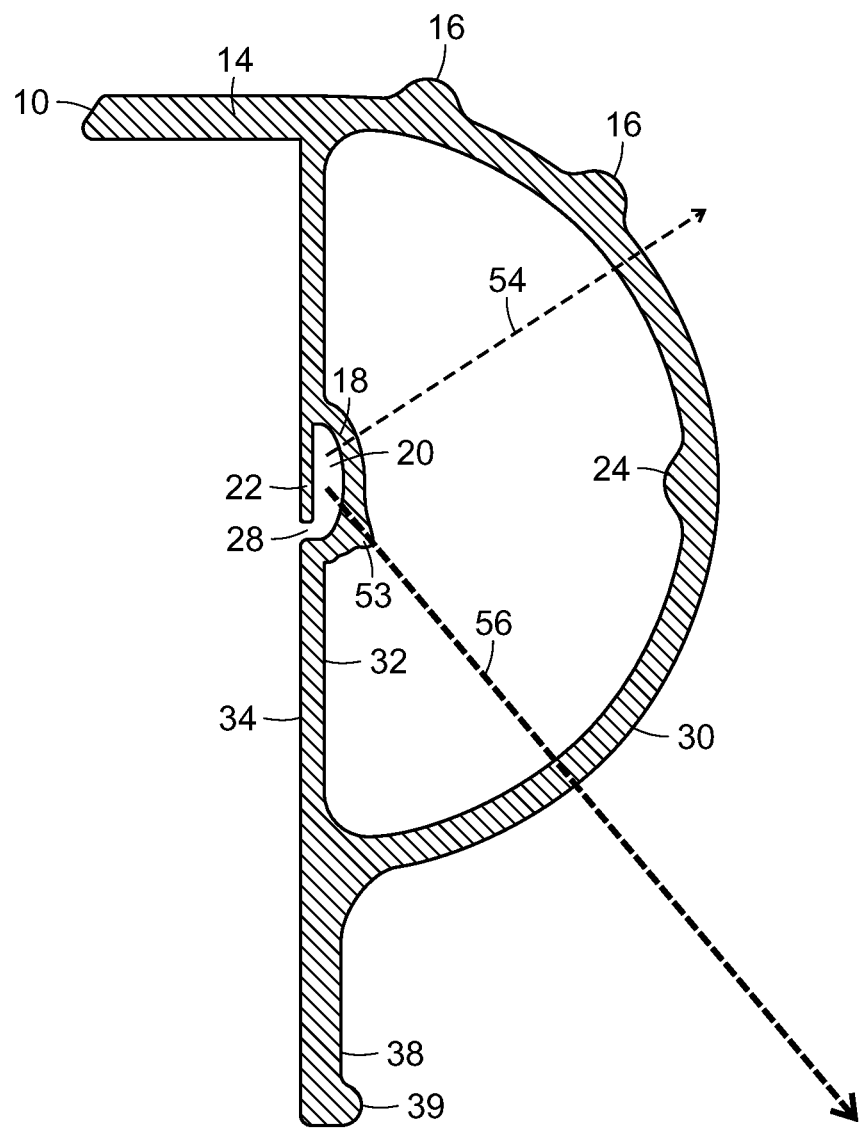
FIG. 4. Illustrates a cross sectional perspective of the light altering bumper of the present invention with the light amplifying lobe embodiment with light source directed downward.
Figure 5:
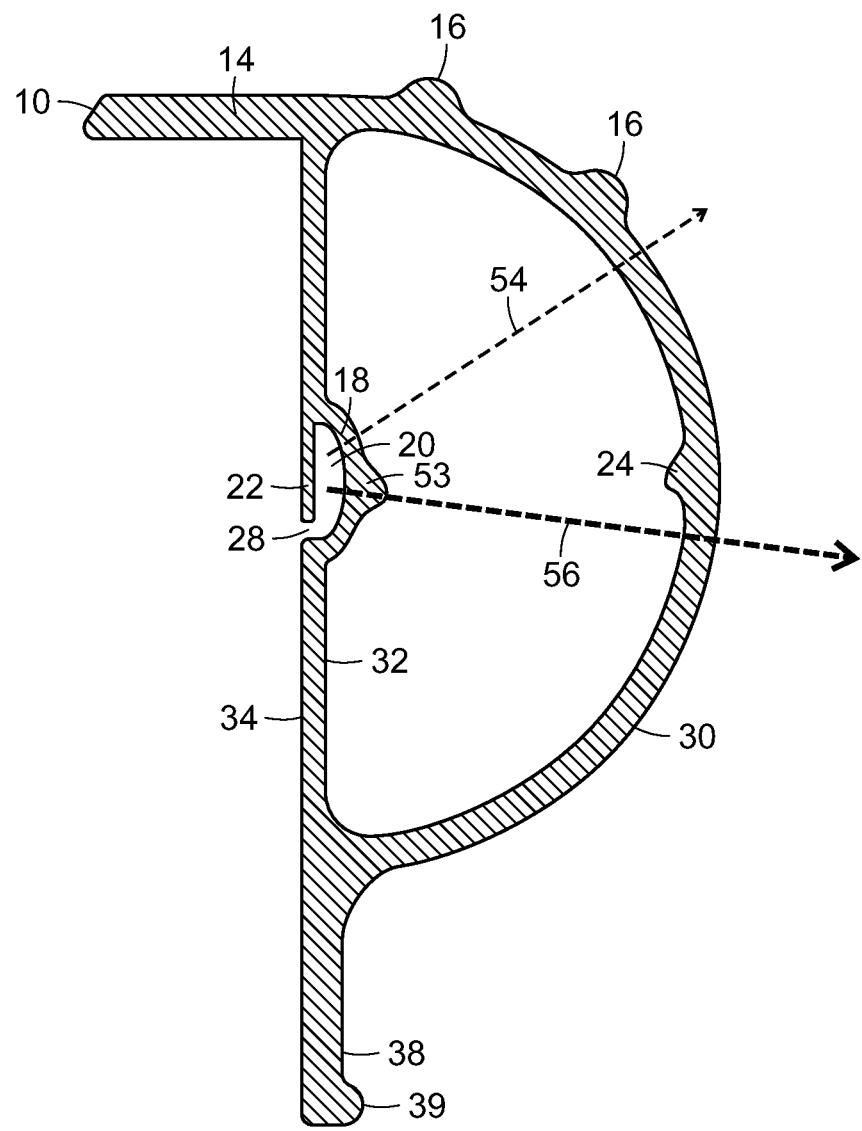
FIG. 5. Illustrates a cross sectional perspective of the light altering bumper of the present invention with the light amplifying lobe embodiment with light source directed downward and out.
Figure 6:
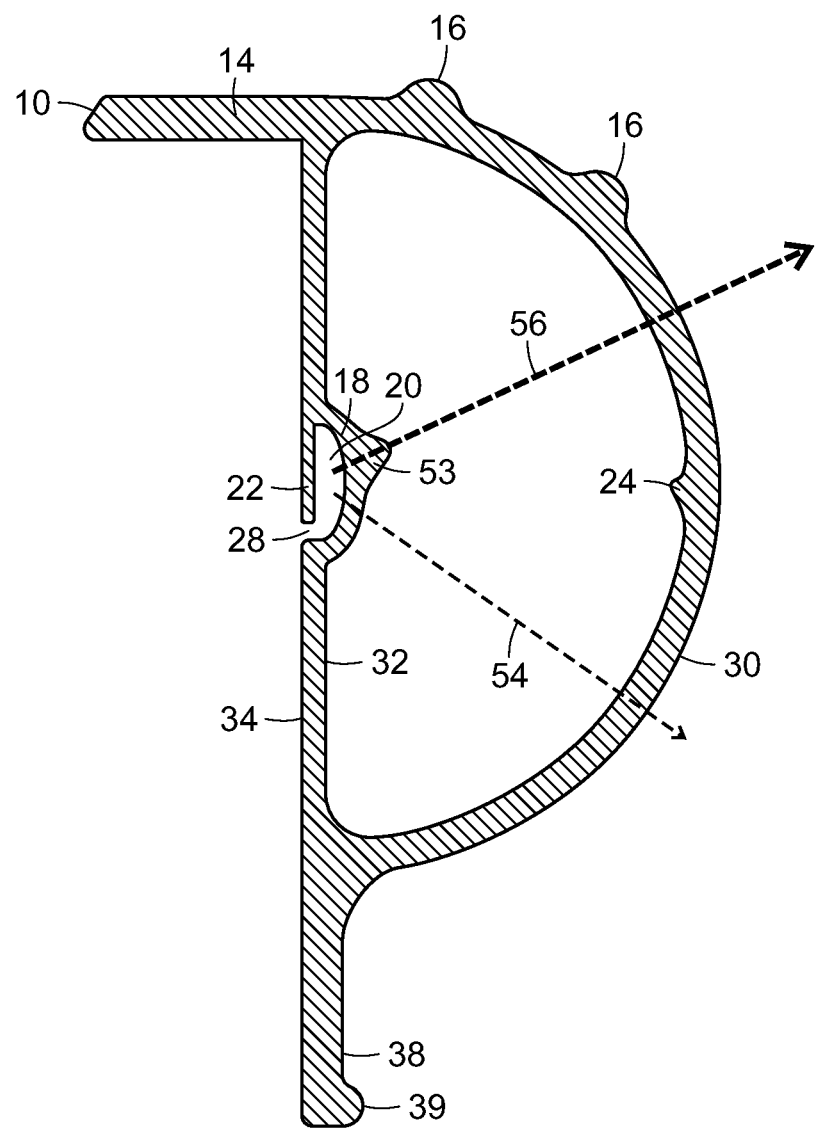
FIG. 6. Illustrates a cross sectional perspective of the light altering bumper of the present invention with the light amplifying lobe embodiment with light source directed upward.
Figure 7:
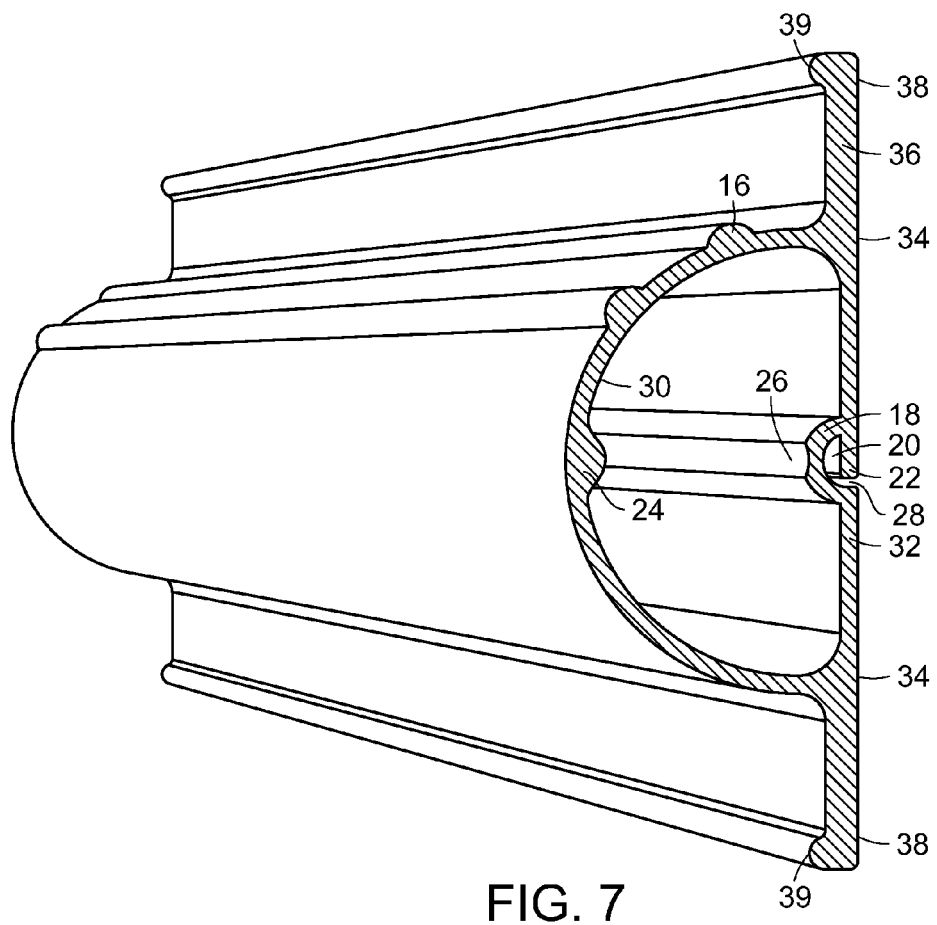
FIG. 7. Illustrates a sectional perspective of an alternative embodiment of the light altering bumper of the present invention.

If the protective housing 18 is shaped differently than the linear concave light refractor 26 then the light source will be warped differently as seen in FIGS. 4-6. By adding a convex lobe known as the amplifying lobe 53, light will travel through the elongated lobe and become condensed much like how a magnifying glass creates a hot spot of light in the sun. Doing this, an intense beam of light can be directed anywhere.

This amplifying lobe 53 is useful to provide additional light to hazardous objects that maybe located adjacent to the dock such as rocks, buoys, beaches or other docks that do not have the light altering bumper. The outer surface of the protective housing 18 comprises an amplifying lobe 53 disposed thereon, the amplifying lobe 53 comprising an outwardly-projecting, solid, elongate member of uniform substantially semi-circular cross-section, which extends along the length thereof; the amplifying lobe 53 for directing the light from the light source therethrough. The amplifying lobe 53 may be upwardly, downwardly or centrally disposed.

Turning to FIG. 4, in one embodiment of the present invention, the amplifying lobe 53 is placed along the protective housing 18 such that the condensed light 56 is primarily directed downward. Alternatively, as shown in FIG. 5, the amplifying lobe 53 can be placed a little further upward than that shown in FIG. 4 such that the condensed light 56 is primarily directed slightly downward and mostly outward. Finally, as shown in FIG. 6, the amplifying lobe 53 can be placed even further upward than that shown in FIG. 5 such that the condensed light 56 is primarily directed slightly upward.

The primary operation of the light altering bumper will be to protect objects such as boats, planes and cars from coming in contact with the hard surface adjacent while illuminating the object it is attached to and the surrounding area. The bumper with its dual mounting lobes 14 and 38 can be attached to any flat rough or hard surface such as but not limited to marine docks, loading docks, decks, wharfs, guard rails, pilings, posts, moorings, buoys, jetties, and piers. The internal light source may have the ability to change color, frequency and brightness with the use of remote, timers, control panel or Wi-Fi device.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the method (and components of the individual operating components of the method) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections might be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. An illuminating dock bumper for attachment to either a dock or a dock vehicle, comprising:
   (a) an elongate, forwardly projecting parabolic arch, which is of uniform substantially-arched cross-section;
   (b) an elongate structural tension member laterally extending between the lateral extremities of the parabolic arch, the structural tension member comprising a planar rear surface about which the structural tension member and thereby the bumper is secured to the dock or the dock vehicle, the structural tension member comprising an elongate, forwardly projecting, protective housing of uniform substantially-arched cross-section disposed on the front surface thereof and along the length thereof, the protective housing for receiving an elongate light source; and
   (c) an amplifying lobe comprising an outwardly-projecting, solid, elongate member of uniform substantially semi-circular cross-section, which extends along the length thereof in which the amplifying lobe directs the light from the light source through the member;
   wherein the amplifying lobe is disposed on the outer surface of the protective housing.

2. The bumper of claim 1 wherein, the parabolic arch and the structural tension member are integral with one another.

3. The bumper of claim 1 made of a translucent material.

4. The bumper of claim 3 wherein, the translucent material comprises polymer.

5. The bumper of claim 1 wherein, the rear surface of the structural tension is lined with a reflective layer.

6. The bumper of claim 1 wherein, the protective housing is centrally disposed on the front surface of the structural tension member.

7. The bumper of claim 1 wherein, the protective housing and the structural tension member are integral with one another.

8. The bumper of claim 1 wherein, the outer surface of the parabolic arch comprises at least one, elongate, grip of uniform solid substantially semi-circular cross-section extending along the length thereof, the at least one grip integral with the parabolic arch.

9. The bumper of claim 8 wherein the at least one grip is disposed on the upper portion of the parabolic arch, which is between the middle and the upper lateral extremity of the parabolic arch.

10. The bumper of claim 1 wherein, the structural tension member comprises an elongate thorough gap disposed along the length thereof; the elongate gap for providing access to the light source.

11. The bumper of claim 1 wherein, the inner surface of the parabolic arch comprises a linear bell-shaped light reflector disposed thereon, the linear bell-shaped light reflector comprising a backwardly-projecting, solid elongate member of uniform, substantially semi-circular cross-section; the linear bell-shaped light reflector extending the length of the parabolic arch.

12. The bumper of claim 1 wherein, the amplifying lobe is obliquely upwardly disposed.

13. The bumper of claim 1 wherein, the amplifying lobe is obliquely downwardly disposed.

14. The bumper of claim 1 wherein, the amplifying lobe is centrally disposed.

15. The bumper of claim 1 further comprising at least one elongate, substantially rectangular mounting lobe with a lateral extremity, the mounting lobe comprising a forwardly-projecting, elongate member of uniform substantially semi-circular cross-section extending along the length thereof; the lateral extremity of elongate member being flush with that of the mounting lobe.

16. The bumper of claim 15 wherein the structural tension member comprises a top lateral extremity and bottom lateral extremity wherein the at least one substantially rectangular mounting lobe extends perpendicularly from the top lateral extremity of the structural tension member; wherein the bumper is attachable over a horizontal surface.

17. The bumper of claim 15 wherein the at least one elongate, substantially rectangular mounting lobe extends downwardly from the bottom lateral extremity of the structural tension member;

wherein the bumper is attachable to a vertical surface.

18. A method for illuminating and protecting a dock comprising:
   (a) Attaching a dock bumper to either a dock or a dock vehicle, the dock bumper made of a translucent material, the dock bumper comprising:
   (i) an elongate, forwardly projecting parabolic arch, which is of uniform substantially-arched cross-section;
   (ii) an elongate structural tension member laterally and integrally extending between the lateral extremities of the parabolic arch, the structural tension member comprising a planar rear surface about which the structural tension member and thereby the bumper is secured to the dock or the dock vehicle, the structural tension member comprising an elongate, forwardly projecting, protective housing of uniform substantially-arched cross-section disposed on the front surface thereof and along the length thereof, the protecting housing integral with the structural tension member, the protective housing for receiving an elongate light source; and
   (c) an amplifying lobe comprising an outwardly-projecting, solid, elongate member of uniform substantially semi-circular cross-section, which extends along the length thereof in which the amplifying lobe directs the light from the light source through the member;

wherein the amplifying lobe is disposed on the outer surface of the protective housing.

* * * * *